US011629968B2

(12) United States Patent
Zhou et al.

(10) Patent No.: US 11,629,968 B2
(45) Date of Patent: Apr. 18, 2023

(54) METHOD AND DEVICE FOR DETERMINING PERSONAL COMMUTE TIME PERIOD

(71) Applicant: Tsinghua University, Beijing (CN)

(72) Inventors: Yuezhi Zhou, Beijing (CN); Xiang Lan, Beijing (CN); Di Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 550 days.

(21) Appl. No.: 16/295,009

(22) Filed: Mar. 7, 2019

(65) Prior Publication Data

US 2019/0277648 A1 Sep. 12, 2019

(30) Foreign Application Priority Data

Mar. 8, 2018 (CN) .......................... 201810191353.2

(51) Int. Cl.
| | |
|---|---|
| *G01C 21/34* | (2006.01) |
| *G08G 1/01* | (2006.01) |
| *G01C 21/36* | (2006.01) |
| *G06Q 50/26* | (2012.01) |

(52) U.S. Cl.
CPC ......... *G01C 21/3484* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 8,762,048 B2* | 6/2014 | Kosseifi | G08G 1/096844 |
| | | | 701/410 |
| 2015/0177011 A1* | 6/2015 | Ibrahimi | G01C 21/343 |
| | | | 701/465 |
| 2019/0086224 A1* | 3/2019 | Sharma | G01C 21/3415 |

* cited by examiner

*Primary Examiner* — Adam D Tissot
*Assistant Examiner* — Laura E Linhardt
(74) *Attorney, Agent, or Firm* — Hodgson Russ LLP

(57) ABSTRACT

Embodiments of the present disclosure provide a method and device for a personal commute time period. The method includes: obtaining data of at least one commute trajectory of a user within a preset time period; performing cluster analysis on the data of the at least one commute trajectory to obtain at least one commute trajectory cluster, and obtaining a combined trajectory according to the commute trajectories in each commute trajectory cluster; for each commute trajectory T of the at least one commute trajectory, determining a commute speed of the user according to a combined trajectory corresponding to a commute trajectory cluster to which the commute trajectory T belongs; and determining a commute time period corresponding to the commute trajectory T according to the commute speed.

12 Claims, 3 Drawing Sheets

METHOD AND DEVICE FOR DETERMINING PERSONAL COMMUTE TIME PERIOD

CROSS REFERENCE TO RELATED APPLICATIONS

This application claims priority to Chinese Patent Application No. 201810191353.2, filed on Mar. 8, 2018, the entire disclosure of which is incorporated herein by reference.

FIELD

The present disclosure relates to a computer application technology field, and more particularly to a method and a device for determining a personal commute time period.

BACKGROUND

With the rapid development of the city, the separation of workplace and residence has intensified, the commute situation of urban residents has become increasingly complicated, and the problem of continuously extended travel time has become more prominent. Especially in the morning and evening peak hours, traffic congestion has become one of the most prominent problems in urban transportation. Improving the commute conditions of urban residents and shortening commute time period have become an inevitable requirement for promoting the improvement of urban living environment and the sustainable development of urban transportation. A long-term and sustainable solution for solving the commute problem of urban residents is to effectively manage and guide residents' travel needs and commute behaviors. Urban residents' travel needs and commute behaviors are often reflected in each urban resident, thus personal commute behaviors of urban residents is an indicator for solving the commute problem of urban residents. Commute time period is one of reflection indicators of commute behaviors of urban residents.

SUMMARY

Embodiments of the present disclosure provide a method for determining a personal commute time period. The method includes: obtaining data of at least one commute trajectory of a user within a preset time period; performing cluster analysis on the data of the at least one commute trajectory to obtain at least one commute trajectory cluster, and obtaining a combined trajectory according to the commute trajectories in each commute trajectory cluster; for each commute trajectory T of the at least one commute trajectory, determining a commute speed of the user according to a combined trajectory corresponding to a commute trajectory cluster to which the commute trajectory T belongs; and determining a commute time period corresponding to the commute trajectory T according to the commute speed.

Embodiments of the present disclosure provide a device for determining a personal commute time period. The device includes: one or more processors; and a memory, configured to store one or more programs, when executed by the one or more processors, cause the one or more processors to perform a method for determining a personal commute time period. The method includes: obtaining data of at least one commute trajectory of a user within a preset time period; performing cluster analysis on the data of the at least one commute trajectory to obtain at least one commute trajectory cluster, and obtaining a combined trajectory according to the commute trajectories in each commute trajectory cluster; for each commute trajectory T of the at least one commute trajectory, determining a commute speed of the user according to a combined trajectory corresponding to a commute trajectory cluster to which the commute trajectory T belongs; and determining a commute time period corresponding to the commute trajectory T according to the commute speed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
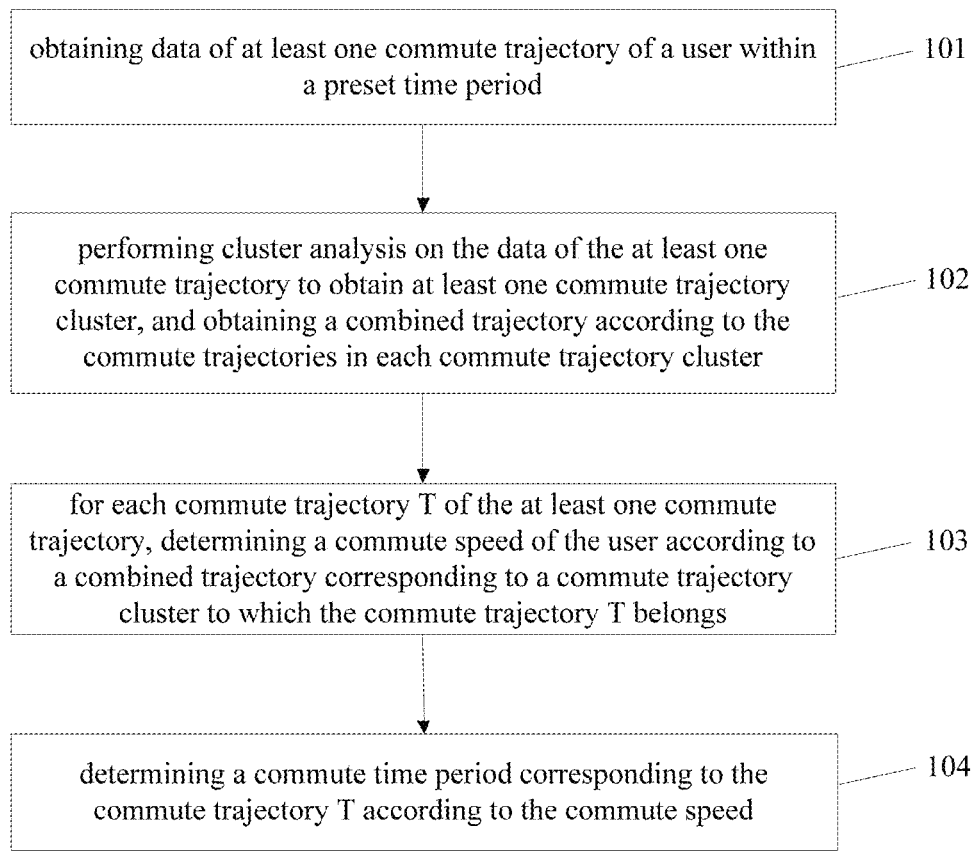
FIG. 1 is a flow chart of a method for determining a personal commute time period according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The present disclosure provides a method and a device for determining a personal commute time period, and will be described in detail with reference to drawings and embodiments.

Due to the randomness of the user using a positioning service of mobile terminals, the positioning coordinate points generated during the commute process of the user are often sparse, which brings challenges to accurately calculate the user's commute time period. Embodiments of the present disclosure are mainly based on following principles. Most people's work places and working hours are relatively fixed, and commute modes and routes are relatively regular. By performing cluster analysis on similar commute trajectory of the user, a relatively accurate commute trajectory of the user can be obtained, and the trajectory can be used as a reference to analyze an accurate commute rate of the user and estimate the commute time period of the user.

FIG. 1 is a flow chart of a method for determining a personal commute time period according to an embodiment of the present disclosure. The method for determining a personal commute time period is performed by one or more computing devices.

As illustrate in FIG. 1, the method for determining a personal commute time period may include following actions.

At block 101, the one or more computing devices obtain data of at least one commute trajectory of a user within a preset time period.

At block 102, the one or more computing devices perform cluster analysis on the data of the at least one commute trajectory to obtain at least one commute trajectory cluster, and obtain a combined trajectory according to the commute trajectories in each commute trajectory cluster.

At block 103, for each commute trajectory T of the at least one commute trajectory, the one or more computing devices determine a commute speed of the user according to a combined trajectory corresponding to a commute trajectory cluster to which the commute trajectory T belongs.

At block 104, the one or more computing devices determine a commute time period corresponding to the commute trajectory T according to the commute speed.

In an embodiment of the present disclosure, the action at block 101 may include follows. Positioning data of the user within the preset time period is collected. A location of the home and a location of the workplace are determined based on the positioning data. The positioning data is ranked based on time, positioning data corresponding to locations between the location of the home and the location of the workplace are selected, and data of the at least one commute trajectory is generated according to the selected out positioning data.

In an embodiment of the present disclosure, the action at block 102 may include follows.

S1, a commute trajectory cluster is initialized according to data of each commute trajectory, to obtain at least one commute trajectory cluster.

In some embodiments, the at least one commute trajectory corresponds to at least one day respectively. The action of S1 may include follows. For a commute trajectory $T_i$ of the $i^{th}$ day, data of record points of the commute trajectory $T_i$ is ranked based on time, where, $1 \leq i \leq N$, N is the number of the at least one commute trajectory. Data of each record point includes a user identification uid, a longitude coordinate lng, a latitude coordinate lat, and a timestamp time. A location array $P_i$ of the commute trajectory $T_i$ is determined based on the longitude coordinates and the latitude coordinates of the record points of the commute trajectory $T_i$, and a time array $D_i$ of used time period between two adjacent record points of the commute trajectory $T_i$ is determined. A commute trajectory cluster $C_i$ is generated based on the commute trajectory $T_i$, the location array $P_i$, and the time array $D_i$, where, $C_i = <<P_i, D_i>, \{T_i\}>$. The location array $P_i$ and the time array $D_i$ forms a combined commute trajectory $<P_i, D_i>$ of the commute trajectory cluster $C_i$.

In an embodiment of the present disclosure, the time array $D_i$ of used time period between two adjacent record points of the commute trajectory $T_i$ is determined according to following formula:

$$D_i[j] = T_i[j+1].time - T_i[j].time$$

where, $D_i[j]$ represents $j^{th}$ element in the time array $D_i$, $T_i[j].time$ represents a timestamp of $j^{th}$ record point $T_i[j]$, and $T_i[j+1].time$ represents a timestamp of $(j+1)^{th}$ record point $T_i[j+1]$.

S2, it is determined whether a number of the at least one commute trajectory cluster is greater than 1.

S3, in response to that the number of the at least one commute trajectory cluster is greater than 1, a similarity between each two commute trajectory clusters is obtained.

In an embodiment of the present disclosure, the similarity between two commute trajectory clusters is determined according to following formula:

$$D_M(A,B) = L(M)/\max(L(A), L(B))$$

where, $D_M(A, B)$ represents the similarity between commute trajectories A and B, M represents a combined commute trajectory of commute trajectories A and B, L(M) represents a length of the combined commute trajectory M, L(A) represents a length of the commute trajectory A, L(B) represents a length of the commute trajectory B.

S4, it is determined whether a smallest similarity of the obtained similarities is greater than a preset similarity threshold.

S5, in response to that the smallest similarity is smaller than or equal to the preset similarity threshold, the two commute trajectory clusters that have the smallest similarity are combined into one commute trajectory cluster.

In an embodiment of the present disclosure, the action of S5 may include follows. A location array $P_a$ of a commute trajectory cluster $C_a$ and a location array $P_b$ of a commute trajectory cluster $C_b$ are combined to obtain a location array $P_m$. The commute trajectory cluster $C_a$ and the commute trajectory cluster $C_b$ are the two commute trajectory clusters that have the smallest similarity. A time array $D_a$ of the commute trajectory cluster $C_a$ and a time array $D_b$ of the commute trajectory cluster $C_b$ are combined to obtain a time array $D_m$. A commute trajectory cluster $C_m$ is generated according to the location array $P_m$, the time array $D_m$, and data of all commute trajectories in the commute trajectory cluster $C_a$ and the commute trajectory cluster $C_b$, where $C_m = <<P_m, D_m>, \{T_m\}>$. $T_m$ represents data of all the commute trajectories in the commute trajectory cluster $C_a$ and the commute trajectory cluster $C_b$.

In an embodiment of the present disclosure, the location array $P_a$ of the commute trajectory cluster $C_a$ and the location array $P_b$ of the commute trajectory cluster $C_b$ are combined as follows. An initial location array $P_m$ is generated based on elements in the location array $P_a$, a location of the home $c_h$, and a location of the workplace $c_w$. Elements in the location array $P_b$ are added into the location array $P_m$ sequentially. The location of the home $c_h$ and the location of the workplace $c_w$ are removed from the location array $P_m$. For each element $r_b$ in the location array $P_b$, the element $r_b$ is added into the location array $P_m$ through follows. For each location k, a total length increment caused by inserting $r_b$ into a location k is determined, where k=pos . . . , Q, pos is a location of an element inserted into the location array $P_m$ last time, Q is a number of elements in the location array $P_m$. A location minimizing the total length increment is selected as the inserting location of $r_b$.

In an embodiment of the present disclosure, the time array $D_a$ of the commute trajectory cluster $C_a$ and the time array $D_b$ of the commute trajectory cluster $C_b$ are combined as follows. Each element in $D_a$ is weighted by distance to obtain $D_a'$, and each element in $D_b$ is weighted by distance to obtain $D_b'$. The time array $D_m$ is determined according to $D_a'$ and $D_b'$ based on a formula of:

$$D_m[i] = \begin{cases} (D_a'[i] + D_b'[i])/2, & \text{if } D_a'[i] \neq 0, D_b'[i] \neq 0 \\ D_a'[i], & \text{if } D_a'[i] \neq 0, D_b'[i] = 0 \\ D_b'[i], & \text{if } D_a'[i] = 0, D_b'[i] \neq 0 \\ 0, & \text{if } D_a'[i] = 0, D_b'[i] = 0 \end{cases}$$

In an embodiment of the present disclosure, each element D[i] in $D_a$ or $D_b$ may be weighted as follows. For each element D[i] in $D_a$ or $D_b$, a position $index_{start}$ of a start record point $r_{start}$ corresponding to D[i] in the location array $P_m$ is determined, and a position index$_{end}$ of an end record point $r_{end}$ corresponding to D[i] in the location array $P_m$ is determined. A sum d of distances between each two adjacent record points located between the position index$_{start}$ and the position index$_{end}$ in $P_m$ is determined based on the location array $P_m$. D[i] is weighted by the sum d to obtain D'[i] according to a formula of:

$$D'[i] = \frac{distance(P_m[i], P_m[i+1])}{d} \times t,$$

where $i \geq index_{start}$, and $i < index_{end}$.

S6, repeating S2-S5, until the number of the at least one commute trajectory cluster is smaller than or equal to 1 or the smallest similarity is greater than the preset similarity threshold.

In an embodiment of the present disclosure, the action at block 104 may include follows. A first location $p_{start}$ and a first time point $t_{start}$ corresponding to a first record point in the commute trajectory T are determined, and a second location $p_{end}$ and a second time point $t_{end}$ corresponding to a last record point in the commute trajectory T are determined. A distance between the first location $p_{start}$ and the second location $p_{end}$ is determined based on the combined trajectory corresponding to the commute trajectory cluster to which the commute trajectory T belongs. The commute speed is determined according to the first time point $t_{start}$, the second time point $t_{end}$, and the distance between the first location $p_{start}$ and the second location $p_{end}$.

In an embodiment of the present disclosure, the commute time period corresponding to the commute trajectory T is determined as follows. A first time period $d_{home}$ used from home of the user to the first point in the combined trajectory is determined according to the commute speed and a distance $l_{home}$ from home of the user to the first point in the combined trajectory, and a second time period $d_{home}$ used from the last point in the combined trajectory to the workplace of the user is determined according to the commute speed and a distance $l_{comp}$ from the last point in the combined trajectory T to the workplace of the user. A third time period $d_{start}$ used from the first point of the combined trajectory to the first location $p_{start}$ is determined according to the combined trajectory, and a fourth time period $d_{end}$ used from the second location $p_{end}$ to the last point of the combined trajectory is determined according to the combined trajectory. A commute start time point and a commute end time point of the user is calculated according to a formula as:

$$t_{leave} = t_{start} - d_{start} - d_{home}$$

$$t_{arrive} = t_{end} + d_{end} + d_{comp};$$

The commute time period corresponding to the commute trajectory T is determined according to a formula as:

$$d_{commute} = t_{arrive} - t_{leave}.$$

Figure 2:
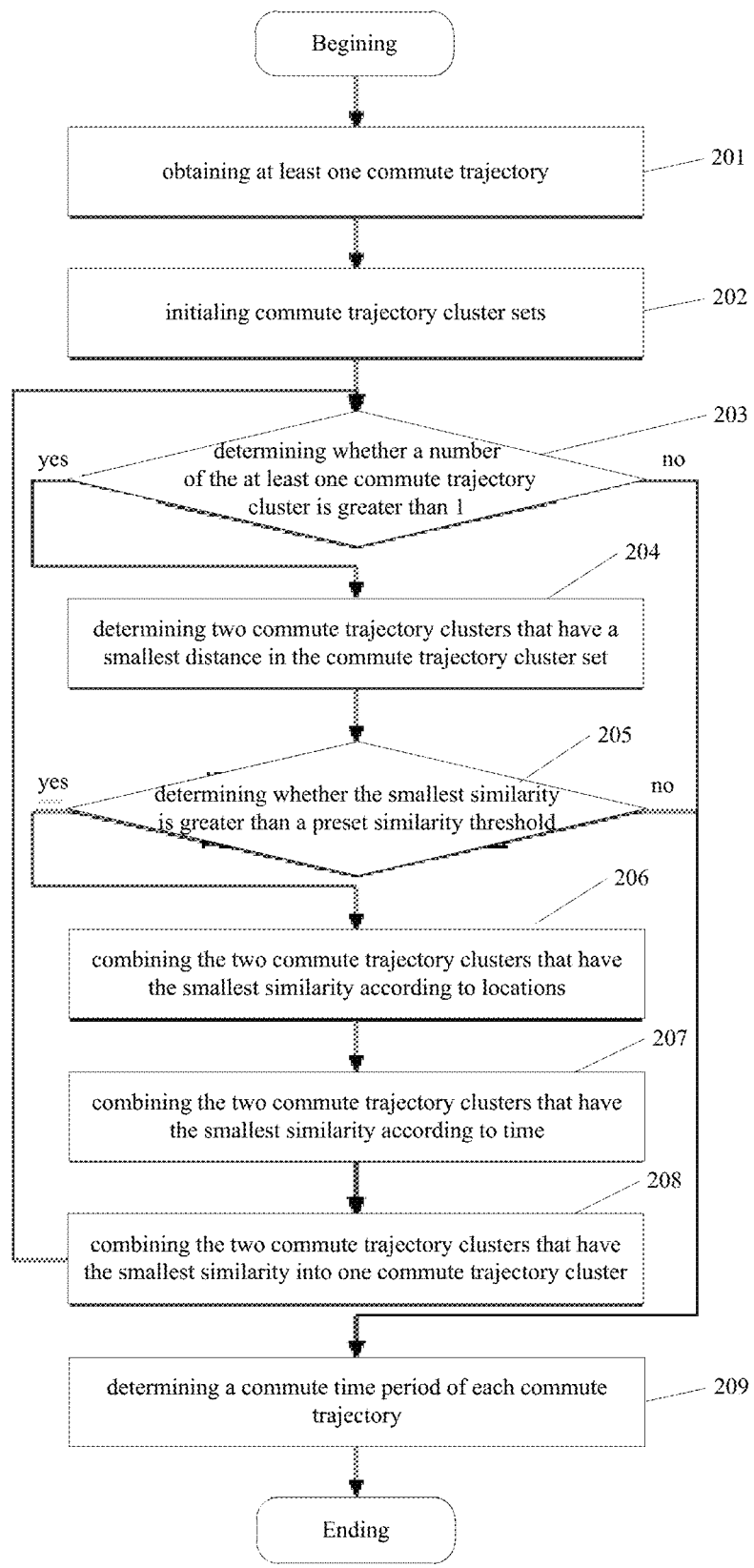
FIG. 2 is a flow chart of a method for determining a personal commute time period according to another embodiment of the present disclosure.

FIG. 2 is a flow chart of a method for determining a personal commute time period according to another embodiment of the present disclosure.

As illustrate in FIG. 2, the method for determining a personal commute time period may include following actions.

At block 201, at least one commute trajectory are obtained.

In an embodiment of the present disclosure, the one or more computing devices may obtain data of at least one commute trajectory of a user within a preset time period by following actions. Positioning data of the user within the preset time period is collected. A location of the home and a location of the workplace are determined based on the positioning data. The positioning data is ranked based on time, positioning data corresponding to locations between the location of the home and the location of the workplace, and generating data of the at least one commute trajectory according to the selected out positioning data.

In detail, the positioning data of the user within the preset time period is collected. For example, the preset time period may be 5 days. The positioning data may be GPS (Global Position System) positioning data. A positioning coordinate at a certain time point may be calibrated according to GPS positioning data of a fixed time window. For example, the fixed time window may be 5 minutes. The GPS positioning data may be collected according to a preset frequency. The GPS positioning data is stored when the user's geographical location changes. The location of the home $c_h$ and the location of the workplace $c_w$ are obtained by using a clustering algorithm. The collected user's coordinates in the positioning data are ranked according to time. Record points generated during a commute between the location of the home and the location of the workplace are selected out from the positioning data, and the commute trajectory of a user of each day is obtained. The commute trajectory includes a plurality of record points ranked according to time. Each record point includes a user identification, a longitude coordinate, a latitude coordinate, and a timestamp. An example of record points may be as Table 1.

TABLE 1

| user identification | longitude coordinate | latitude coordinate | timestamp |
|---|---|---|---|
| 18888888888 | 116.48538046281186 | 39.91997316108877 | 2017-11-1708:05:12 |
| 18888888888 | 116.4853260011363 | 39.921590169591305 | 2017-11-1708:13:28 |
| 18888888888 | 116.48127777002657 | 39.928038997734525 | 2017-11-1708:16:34 |
| 18888888888 | 116.48200856774548 | 39.93027345731247 | 2017-11-1708:17:53 |

At block 202, a commute trajectory cluster set is initialized according to data of each commute trajectory.

In an embodiment of the present disclosure, the at least one commute trajectory corresponds to at least one day respectively. The commute trajectory cluster is initialized as follows.

A commute trajectory cluster is defined as <trajectory$_m$, trajectories>. trajectories represents a set of all the trajectories in the commute trajectory cluster, denoted as trajectories={T}, where T represents all the trajectories of the user in the commute trajectory cluster. trajectory$_m$ represents a combined commute trajectory obtained by combining all the trajectories in the commute trajectory cluster, denoted as trajectory$_m$=<P, D>, where P is a location array of the commute trajectories, representing locations of the user, D is a time array of used time period between two adjacent record points, representing a time period used by the user moves between the two adjacent record points.

For a commute trajectory $T_i$ of the $i^{th}$ day, data of record points of the commute trajectory $T_i$ is ranked based on time, where, $1 \le i \le N$, N is the number of the at least one commute trajectory. Data of each record point includes a user identification uid, a longitude coordinate lng, a latitude coordinate lat, and a timestamp time. The longitude coordinates and the latitude coordinates included in the data of record points in the commute trajectory $T_i$ are put into a corresponding location array $P_i$ of the commute trajectory $T_i$. The time array $D_i$ is calculated based on the timestamps of the commute trajectory $T_i$. An initialized combined commute trajectory of the commute trajectory $T_i$ is generated according to $P_i$ and $D_i$, and an initialized commute trajectory cluster is obtained, denoted as $C_i$: $C_i = <<P_i, D_i>, \{T_i\}>$. The commute trajectory cluster set (denoted as clusters) includes all the initialized commute trajectory clusters.

The time array $D_i$ of the commute trajectory $T_i$ is determined according to following formula:

$$D_i[j] = T_i[j+1].time - T_i[j].time$$

where, $D_i[j]$ represents $j^{th}$ element in the time array $D_i$, $T_i[j]$.time represents a timestamp of $j^{th}$ record point $T_i[j]$, and $T_i[j+1]$.time represents a timestamp of $(j+1)^{th}$ record point $T_i[j+1]$.

$D_i$ represents the time period used by the user to move from one location record to another location record in the commute trajectory $T_i$.

For data of a commute trajectory illustrated in Table 1, a time array is [496, 186, 79] (with a unit of second), including a time period used by the user to move from the first record point to the second record point, a time period used by the user to move from the second record point to the third record point, and a time period used by the user to move from the third record point to the fourth record point.

At block 203, it is determined whether a number of the at least one commute trajectory cluster is greater than 1.

If the number of the at least one commute trajectory cluster is greater than 1, an action at block 204 is performed, otherwise an action at block 209 is performed.

That is, if the number of the commute trajectory clusters in the commute trajectory cluster set clusters is smaller than or equal to 1, the process of performing the cluster analysis is finished, and the action at block 209 is performed, otherwise the action at block 204 is performed.

At block 204, a similarity between each two commute trajectory clusters in the commute trajectory cluster set clusters is obtained, and a smallest similarity of the obtained similarities is determined. The two commute trajectory clusters that have the smallest similarity are denoted as $C_a$ and $C_b$, and the smallest similarity is denoted as $D_{ab}$. If $D_{ab}$ is greater than a preset similarity threshold $d_{max}$, the process of performing the cluster analysis is finished, and the action at block 209 is performed, otherwise the action at block 205 is performed. In an embodiment of the present disclosure, $d_{max}$ may be 1.05.

In an embodiment of the present disclosure, the similarity between each two commute trajectory clusters is a similarity of the two combined commute trajectory corresponding to the two commute trajectory clusters.

For example, L(X) represents a length of a commute trajectory X. M represents a trajectory obtained by combining commute trajectories A and B. A similarity $D_M$ between commute trajectories A and B is determined according to a formula of:

$$D_M(A,B) = L(M)/\max(L(A), L(B)).$$

This is based on following principle. The similarity between two commute trajectories or two commute trajectory clusters is an indicator of similarity between two commute trajectories or two commute trajectory clusters. This indicator is suitable for determining a spatial similarity between trajectories. After similar commute trajectories are combined, a space shape of the trajectories does not change greatly, thus the trajectory length does not increase greatly.

At block 205, it is determined whether the smallest similarity of the obtained similarities is greater than a preset similarity threshold.

If the smallest similarity is smaller than or equal to the preset similarity threshold, an action at block 206 is performed, otherwise the action at block 209 is performed.

At block 206, the two commute trajectory clusters that have the smallest similarity are combined according to locations.

For example, the two commute trajectory clusters that have the smallest similarity are commute trajectory cluster $C_a$ and commute trajectory cluster $C_b$. A combined commute trajectory of commute trajectory cluster $C_a$ is $T_a$. A combined commute trajectory of commute trajectory cluster $C_b$ is $T_b$. A location array $P_a$ is obtained by extracting longitude coordinates and latitude coordinates in the positioning data corresponding to the combined commute trajectory $T_a$. A location array $P_b$ is obtained by extracting longitude coordinates and latitude coordinates in the positioning data corresponding to the combined commute trajectory $T_b$. Firstly, the location $c_h$ of the home of the user, positioning data in the location array $P_a$, and the location $c_w$ of the workplace of the user are added into a location array $P_m$. The location array $P_m$ represents a location array $P_m$ of the combined commute trajectory. Then positioning data in the location array $P_b$ are inserted into the location array $P_m$ one by one. For each element in the location array $P_b$, an inserting location of the element is selected to minimize change of the length increment of the combined commute trajectory, and inserting location of the element is behind an inserting location of an element inserted last time. Therefore, by this inserting algorithm, it can not only maintain the similarity between the combined commute trajectory and original commute trajectories, but also not destroy the topological relationship between the original commute trajectory points in a time dimension.

In detail, the action at block 206 may include follows.

(1.1) The location $c_h$ of the home of the user, the positioning data in the location array $P_a$, and the location $c_w$ of the workplace of the user are used to initialize the location array $P_m$. An initial $P_m$ is an empty set. The location $c_h$ of the home of the user is inserted into $P_m$. All the elements of in the location array $P_a$ are inserted into $P_m$ in a chronological order. Then the location $c_w$ of the workplace of the user is inserted into $P_m$.

(1.2) After an element in $P_b$ is inserted into $P_m$ last time, a location of the element inserted into $P_m$ last time is indicated by pos. An initial value of pos is 0.

(1.3) For each element $r_b$ in $P_b$, a total length increment delta of $P_m$ caused by inserting $r_b$ into a location i behind pos in $P_m$ is determined according to a function of: distance($P_m[i]$, $r_b$)+distance($r_b$, $P_m[i+1]$)−distance($P_m[i]$, $P_m[i+1]$). Therefore, a location $i_{min}$ that can minimize delta can be found. Then $r_b$ is inserted into the location $i_{min}$ of $P_m$, and pos is updated. The function distance is used for determining a geographical distance between two points. The geographical distance between two points may be obtained according to geographical locations (such as longitude coordinates and the latitude coordinates) of the two points and radians corresponding to the geographical locations of the points.

(1.4) Progress in (1.3) are repeated until all the elements in $P_b$ are inserted into $P_m$.

(1.5) The location $c_h$ of the home of the user and the location $c_w$ of the workplace of the user are removed from $P_m$, to obtain the location array $P_m$ of the combined commute trajectory.

An example of combining the two commute trajectory clusters according to locations is as follows. The location $c_h$ of the home of the user is [116.48619520243432, 39.92009758613815], and the location $c_w$ of the workplace of the user is [116.48278442042464, 39.92971495026715]. The location array $P_a$ of a commute trajectory $T_a$ on Nov. 16, 2017 is as:

[[116.48538046281186, 39.91997316108877],
[116.48505889927493, 39.92057701210388],
[116.48635028657858, 39.92100243904391],
[116.4853260011363, 39.921590169591305],
[116.48139650351561, 39.92156608777231],
[116.48143100996526, 39.92402903839183],
[116.48127777002657, 39.928038997734525],
[116.48145610441792, 39.92922973056104],
[116.48200856774548, 39.93027345731247]]

The location array $P_b$ of a commute trajectory $T_b$ on Nov. 16, 2017 is as:

[[116.4850408588704, 39.920915723478345],
[116.48623436180598, 39.92093093690406],
[116.48613593748581, 39.92146255772444],
[116.4814054906271, 39.921462198740755],
[116.48159130675258, 39.92509554580711],
[116.48172388760149, 39.929855472054584]]

A location array of the combined commute trajectory is as:

[[116.48538046281186, 39.91997316108877],
[116.48505889927493, 39.92057701210388],
[116.4850408588704, 39.920915723478345],
[116.48623436180598, 39.92093093690406],
[116.48635028657858, 39.92100243904391],
[116.48613593748581, 39.92146255772444],
[116.4853260011363, 39.921590169591305],
[116.4814054906271, 39.921462198740755],
[116.48139650351561, 39.92156608777231],
[116.48143100996526, 39.92402903839183],
[116.48159130675258, 39.92509554580711],
[116.48127777002657, 39.928038997734525],
[116.48145610441792, 39.92922973056104],
[116.48172388760149, 39.929855472054584],
[116.48200856774548, 39.93027345731247]]

At block 207, the two commute trajectory clusters that have the smallest similarity are combined according to time.

For example, the two commute trajectory clusters that have the smallest similarity are commute trajectory cluster $C_a$ and commute trajectory cluster $C_b$. A combined commute trajectory of commute trajectory cluster $C_a$ is $T_a$. A combined commute trajectory of commute trajectory cluster $C_b$ is $T_b$. A time array $D_a$ corresponding to the combined commute trajectory $T_a$ is obtained according to above formula for determining the time array $D_i$ illustrated in actions at block 202. Similarly, a time array $D_b$ corresponding to the combined commute trajectory $T_b$ is obtained according to above formula. $P_m$ is the location array obtained by combining $T_a$ and $T_b$ at block 206. Time arrays $D_a$ and $D_b$ are weighted by distance according to distances between points on the commute trajectory, based on locations in $P_m$ of record points in $P_a$, locations in $P_m$ of record points in $P_b$, to obtain time arrays $D_a'$ and $D_b'$ weighted by distance. $D_a'$ represents a speed of the user in $T_a$, or a time period of movement between two adjacent points in $P_m$. $D_b'$ represents a speed of the user in $T_b$, or a time period of movement between two adjacent points in $P_m$. A time array $D_m$ of used time period between two adjacent record points corresponding to the combined commute trajectory is obtained by combining $D_a'$ and $D_b'$.

In detail, the action at block 207 may include follows.

(2.1) An initial $D_a'$ is a set whose size is a size of $P_m$ minus 1 and whose values are 0.

(2.2) For each time period t in $D_a$, a start point $r_{start}$ of t and an end point $r_{end}$ of t are determined, and a location $index_{start}$ corresponding to $r_{start}$ in $P_m$ and a location $index_{end}$ corresponding to $r_{end}$ in $P_m$ are determined. A sum d of the distances between each two adjacent record points located between $index_{start}$ and $index_{end}$ in $P_m$ is calculated. The time period t located between $r_{start}$ and $r_{end}$ in $D_a$ is weighted by the sum d of the distances and added into $D_a'$, according to a formula of:

$$D'[i] = \frac{distance(P_m[i], P_m[i+1])}{d} \times t,$$

where $i \geq index_{start}$, and $i < index_{end}$ $D_a'$ is returned as a time array of used time obtained by weighting $T_a$ by distances between adjacent points in the location array $P_m$.

(2.3) By repeating processes similar to above processes in (2.1) and (2.2) for $D_b$, $D_b'$ is returned as a time array of used time obtained by weighting $T_b$ by distances between adjacent points in the location array $P_m$.

(2.4) $D_a'$ and $D_b'$ are traversed, and for each position of $D_a'$ and $D_b'$, if both a value of an element at the position in $D_a'$ and a value of an element at the position in $D_b'$ are not 0, an average of the value of the element at the position in $D_a'$ and the value of an element at the position in $D_b'$ is taken as a value of an element at the corresponding position in $D_m$, otherwise, the value not 0 is taken as the value of the element at the corresponding position in $D_m$. In an embodiment of the present disclosure, a value of an element $D_m[i]$ at a position i in $D_m$ may be determined as:

$$D_m[i] = \begin{cases} (D_a'[i] + D_b'[i])/2, & \text{if } D_a'[i] \neq 0, D_b'[i] \neq 0 \\ D_a'[i], & \text{if } D_a'[i] \neq 0, D_b'[i] = 0 \\ D_b'[i], & \text{if } D_a'[i] = 0, D_b'[i] \neq 0 \\ 0, & \text{if } D_a'[i] = 0, D_b'[i] = 0 \end{cases}$$

$D_m$ is returned as a time array of used time between two adjacent points in the combined commute trajectory.

An example of combining the two commute trajectory clusters according to time is as follows. The location array $P_m$ of the combined trajectory of the commute trajectories $T_a$ and $T_b$ is obtained according to the actions at block 206. The time array $D_a$ corresponding to the commute trajectory $T_a$ of the user on Nov. 16, 2017 is [40, 30, 50, 120, 50, 70, 40, 60] with a unit of second. The time array $D_b$ corresponding to the commute trajectory $T_b$ of the user on Nov. 16, 2017 is [40, 60, 200, 120, 280] with a unit of second. The time array $D_m$ of used time between two adjacent points after the combining is:

[40.0,
7.431102045681536,
30.03393803231097,
6.929599653405515,
35.20066423224522,
31.524320060233777,
140.58949951908838,
3.7223130722746047,
65.59172191326553,
27.023542395389306,
111.61943967794674,
54.882504097200126,
36.64911639907499,
25.035579849448087],
with a unit of second.

At block 208, the two commute trajectory clusters that have the smallest similarity are combined into one commute trajectory cluster.

By actions at blocks 206 and 207, the location array $P_m$ and the time array $D_m$ of used time between two adjacent points of the trajectory that combines the commute trajectories $T_a$ and $T_b$ according to both location and time are determined. $T_a$ and $T_b$ correspond to commute trajectory clusters $C_a$ and $C_b$ respectively. Firstly, $<P_m, D_m>$ is used as an initial commute trajectory cluster $C_m$, and then trajectories in $C_a$ and $C_b$ are added into $C_m$. $C_m$ is added into clusters as a combined cluster of $C_a$ and $C_b$, and $C_a$ and $C_b$ are removed from clusters. Then actions at block 203 is performed again.

Actions at blocks 203-208 are repeated until the number of the at least one commute trajectory cluster is smaller than or equal to 1 or the smallest similarity is greater than the preset similarity threshold.

At block 209, a commute time period of each commute trajectory is determined.

User commute has three important indicators in time dimension, including a start time point of commute, an end time point of commute, and a commute time period. For a commute trajectory of the user every day, the commute trajectory cluster where the commute trajectory is located is determined, and the combined commute trajectory (also called combined trajectory) included in the commute trajectory cluster is taken as a reference trajectory corresponding to the commute trajectory of the user. Since the reference trajectory only includes locations of user during the commute process, it is not possible to directly obtain the time point when the user starts from home and the time point when the user arrives at the workplace. In embodiments of the present disclosure, a time period used by the user from home to a first point of the reference trajectory and a time period used by the user from a last point of the reference trajectory to the workplace are estimated according an average commute speed of the commute trajectory of the day.

In an embodiment of the present disclosure, the actions at block 209 may be performed as follows.

A commute trajectory is selected from the commute trajectories obtained at block 201. $p_{start}$ represents a first point in the selected commute trajectory. The first point represents that the user has left home and the commute begins. $p_{end}$ represents a last point in the selected commute trajectory. The last point represents that the user is arriving at the workplace. $t_{start}$ represents a time point corresponding to $p_{start}$, and $t_{end}$ represents a time point corresponding to $p_{end}$. The reference trajectory of the selected commute trajectory is divided into three parts by $p_{start}$ and $p_{end}$. A first part before $p_{start}$ is denoted as trajectory$_{start}$, a second part between $p_{start}$ and $p_{end}$ is denoted as trajectory$_{mid}$, and a third part after $p_{end}$ is denoted as trajectory$_{end}$. A length $l_{mid}$ of trajectory$_{mid}$ is obtained, and then an average speed of the user may be calculated according to a formula of: $v_{avg}=l_{mid}/(t_{end}-t_{start})$.

In an embodiment of the disclosure, a length of a trajectory may be obtained by summing geographical distances between each two adjacent points located in the trajectory. For example, a trajectory includes three points X, Y and Z. X is a start point of the trajectory, and Z is an end point of the trajectory. A geographical distance between X and Y is D1, and a geographical distance between Y and Z is D2. Then a length of the trajectory is D1+D2.

For the selected commute trajectory above, $d_{home}$ represents a first time period used by the user from home of the user to the first point in the reference trajectory, $l_{home}$ represents a length from home of the user to the first point in the reference trajectory, $d_{comp}$ represents a second time period used by the user from the last point in the reference trajectory to the workplace of the user, $l_{comp}$ represents a length from the last point in the reference trajectory to the workplace of the user. In an embodiment, $l_{home}$ may be obtained by calculating a geographical distance between the location of the home of the user and a location of the first point in the reference trajectory, and $l_{comp}$ may be obtained by calculating a geographical distance between a location of the last point in the reference trajectory and the location of workplace of the user. Then $d_{home}=l_{home}/v_{avg}$, and $d_{comp}=l_{comp}/v_{avg}$. In addition, $d_{start}$ corresponding to trajectory$_{start}$ and $d_{end}$ corresponding to trajectory$_{end}$ can be determined according to the time array of the reference trajectory. $d_{start}$ represents a time period corresponding to trajectory$_{start}$, i.e. a time period used from the first point of the reference trajectory to $p_{start}$, and $d_{end}$ represents a time period corresponding to trajectory$_{end}$, i.e. a time period used from $p_{end}$ to the last point of the reference trajectory. Then a commute start time point (i.e., the time point of leaving home) of the user and a commute end time point (i.e., the time point of arriving at the workplace) of the user may be calculated as follows:

$$t_{leave}=t_{start}-d_{start}-d_{home},$$

$$t_{arrive}=t_{end}+d_{end}+d_{comp}.$$

Then commute time period $d_{commute}$ of the user is determined according to the commute start time point $t_{leave}$ and the commute end time point $t_{arrive}$ based on following formula:

$$d_{commute}=t_{arrive}-t_{leave}.$$

For example, $p_{start}$ in a commute trajectory of the user on Nov. 17, 2017 is [116.4850408588704, 39.920915723478345], $p_{end}$ in the commute trajectory on Nov. 17, 2017 is [116.48172388760149, 39.929855472054584], corresponding $t_{start}$ is 8:05:00 a.m., and corresponding $t_{end}$ is 8:16:40 a.m. The reference trajectory of the commute trajectory on Nov. 17, 2017 is divided into three parts: trajectory$_{start}$, trajectory$_{mid}$, and trajectory$_{end}$ by $p_{start}$ and $p_{end}$. Length of trajectory$_{start}$ is $l_{start}$=181.07 m, length of trajectory$_{mid}$ is $l_{mid}$=1513.69 m, and length of trajectory$_{end}$ is $l_{end}$=216.40 m. The time period used corresponding to trajectory$_{mid}$ is $(t_{end}-t_{start})$=700 s. Thus the average speed of the user may be calculated by: $v_{avg}=l_{mid}/(t_{end}-t_{start})$=1513.69/700=2.162 m/s. $l_{home}$ and $l_{comp}$ may be obtained based on the location of home and location of the workplace as $l_{home}$=70.85 m and $l_{comp}$=90.74 m. Then, it can be calculated that $d_{home}=l_{home}/v_{avg}$=32.76 s, $d_{comp}=l_{comp}/v_{avg}=41.96$ s. It can be calculated according to the time array of the reference trajectory that $d_{start}$ is 47.43 s, and $d_{end}$ is 25.04 s. Thus, It can be calculated that, the commute start time point $t_{leave}$ of the user: $t_{leave}=t_{start}-d_{start}-d_{home}=8:03:40$ a.m., and the commute end time point $t_{arrive}$ of the user: $t_{arrive}=t_{end}+d_{end}+d_{comp}=8:17:47$ a.m. Thus the commute time period is calculated as: $d_{commute}=t_{arrive}-t_{leave}=847$ s.

With the method for determining a personal commute time period, both location characteristic and time characteristic are taken into account, and commute start time point and the commute end time point are estimated according to the commute speed of the user, thus it is more accurate. In addition, by combining similar commute trajectories of a plurality of days, a problem that the positioning points are sparse in the user's commuting process, thus obtaining a more accurate user trajectory. In combination with the combined commute trajectory, the time period used from the location of home of the user to the first point in the commute trajectory of the user and the time period used from the last point in the commute trajectory of the user to the location of the workplace of the user are taken into account, thus the obtained commute time period is more accurate. By obtaining characteristics such as the commute time period, the commute distance, it is helpful to for understanding the travel demand and commute behavior of urban residents, and these characteristics can be used for traffic prediction, improving traffic conditions, thereby improving the commute efficiency of urban residents.

The present disclosure further provides a device for determining a personal commute time period. The device for determining a personal commute time period includes one or more processors; and a memory. The memory is configured to store one or more programs, when executed by the one or more processors, cause the one or more processors to perform the method for determining a personal commute time period according to above embodiments.

Figure 3:
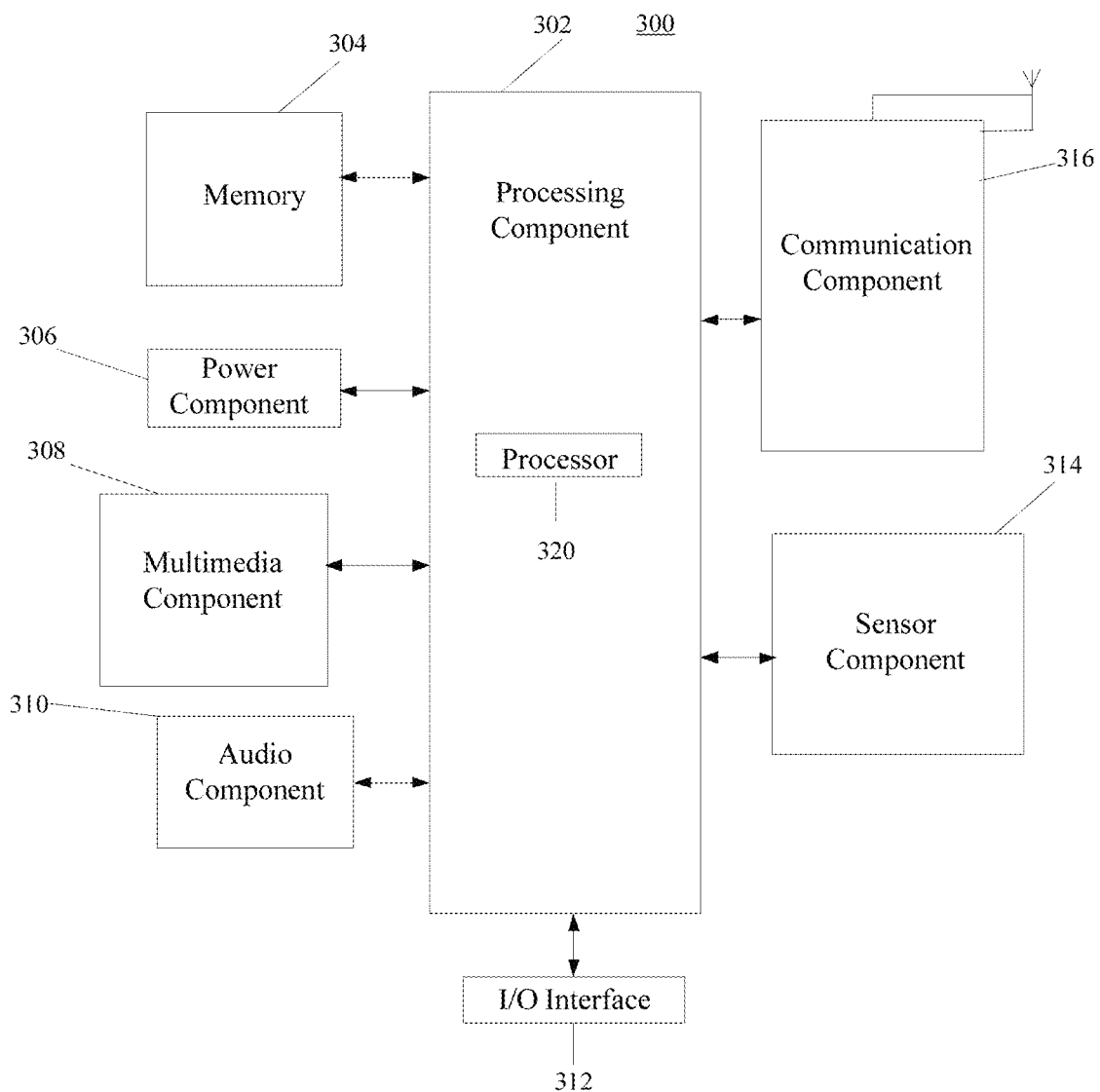
FIG. 3 is a block diagram of a device for determining a personal commute time period according to an embodiment of the present disclosure.

FIG. 3 is a block diagram of a device for determining a personal commute time period according to an embodiment of the present disclosure.

Referring to FIG. 3, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In addition, as is employed herein, the term "about" when employed in conjunction with a value such as a molecular weight or weight percent composition is intended to mean the stated value and a range of values one having ordinary skill in the art would recognize as providing a composition having the properties of the present invention.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for determining a personal commute time period, performed by one or more computing devices, comprising:
    collecting positioning data of a user within a preset time period, the positioning data being Global Positioning System (GPS) positioning data of a mobile terminal that is collected according to a preset frequency and stored when the user's geographical location changes;
    determining a location of home and a location of workplace of the user based on positioning data;
    ranking the positioning data based on time, selecting positioning data corresponding to locations between the location of the home and the location of the workplace, and generating data of the at least one commute trajectory according to the selected out positioning data, the at least one commute trajectory respectively corresponding to at least one day within the preset time period, and each commute trajectory is a trajectory from the home to the work place of the user;
    performing, by the one or more computing devices, cluster analysis on the data of the at least one commute trajectory to obtain at least one commute trajectory cluster, and obtaining a combined trajectory by combining the commute trajectories in the corresponding commute trajectory cluster;
    wherein performing, by the one or more computing devices, cluster analysis on the data of the at least one commute trajectory to obtain at least one commute trajectory cluster comprises:
        S1, initializing a commute trajectory cluster according to data of each commute trajectory, to obtain at least one commute trajectory cluster;
        S2, determining whether a number of the at least one commute trajectory cluster is greater than 1;
        S3, in response to that the number of the at least one commute trajectory cluster is greater than 1, obtaining a similarity between each two commute trajectory clusters;
        S4, determining whether a smallest similarity of the obtained similarities is greater than a preset similarity threshold;
        S5, in response to that the smallest similarity is smaller than or equal to the preset similarity threshold, combining the two commute trajectory clusters that have the smallest similarity into one commute trajectory cluster; and
        S6, repeating S2-S5, until the number of the at least one commute trajectory cluster is smaller than or equal to 1 or the smallest similarity is greater than the preset similarity threshold;
    for each commute trajectory T of the at least one commute trajectory, determining, by the one or more computing devices, a commute speed of the user according to a combined trajectory corresponding to a commute trajectory cluster to which the commute trajectory T belongs;
    determining, by the one or more computing devices, a commute time period corresponding to the commute trajectory T according to the commute speed; and
    displaying each commute trajectory T and the commute time period corresponding to each commute trajectory T on a display screen of the mobile terminal;
    wherein the at least one commute trajectory corresponds to at least one day respectively, and initializing a commute trajectory cluster according to data of each commute trajectory, to obtain at least one commute trajectory cluster comprises:
        for a commute trajectory $T_i$ of the $i^{th}$ day, ranking data of record points of the commute trajectory $T_i$ based on time, wherein, $1 \leq i \leq N$, N is the number of the at least one commute trajectory, data of each record point comprises a user identification uid, a longitude coordinate lng, a latitude coordinate lat, and a timestamp time;
        determining a location array $P_i$ of the commute trajectory $T_i$ based on the longitude coordinates and the latitude coordinates of the record points of the commute trajectory $T_i$, and determining a time array $D_i$ of used time period between two adjacent record points of the commute trajectory $T_i$; and
        generating a commute trajectory cluster $C_i$ based on the commute trajectory $T_i$, the location array $P_i$, and the time array $D_i$, where, $C_i = <<P_i, D_i>, \{T_i\}>$, the location array $P_i$, and the time array $D_i$ forms a combined commute trajectory $<P_i, D_i>$ of the commute trajectory cluster $C_i$;
    wherein the similarity between two commute trajectory clusters is determined according to following formula:

$$D_M(A,B) = L(M)/\max(L(A), L(B))$$

where, $D_M(A, B)$ represents the similarity between commute trajectories A and B, M represents a combined commute trajectory of commute trajectories A and B, L(M) represents a length of the combined commute trajectory M, L(A) represents a length of the commute trajectory A, L(B) represents a length of the commute trajectory B.

2. The method according to claim 1, wherein the time array $D_i$ of used time period between two adjacent record points of the commute trajectory $T_i$ is determined according to following formula:

$$D_i[j] = T_i[j+1].\text{time} - T_i[j].\text{time}$$

where, $D_i[j]$ represents $j^{th}$ element in the time array $D_i$, $T_i[j]$.time represents a timestamp of $j^{th}$ record point $T_i[j]$, and $T_i[j+1]$.time represents a timestamp of $(j+1)^{th}$ record point $T_i[j+1]$.

3. The method according to claim 1, wherein combining the two commute trajectory clusters that have the smallest similarity into one commute trajectory cluster comprises:
    combining a location array $P_a$ of a commute trajectory cluster $C_a$ and a location array $P_b$ of a commute trajectory cluster $C_b$, to obtain a location array $P_m$, wherein the commute trajectory cluster $C_a$ and the commute trajectory cluster $C_b$ are the two commute trajectory clusters that have the smallest similarity;
    combining a time array $D_a$ of the commute trajectory cluster $C_a$ and a time array $D_b$ of the commute trajectory cluster $C_b$, to obtain a time array $D_m$; and
    generating a commute trajectory cluster $C_m$ according to the location array $P_m$, the time array $D_m$, and data of all commute trajectories in the commute trajectory cluster $C_a$ and the commute trajectory cluster $C_b$, wherein $C_m = <<P_m, D_m>, \{T_m\}>$, $T_m$ represents data of all the commute trajectories in the commute trajectory cluster $C_a$ and the commute trajectory cluster $C_b$.

4. The method according to claim 3, wherein combining the location array $P_a$ of the commute trajectory cluster $C_a$ and the location array $P_b$ of the commute trajectory cluster $C_b$, to obtain the location array $P_m$, comprises:
  generating an initial location array $P_m$ based on elements in the location array $P_a$, a location of the home $c_h$, and a location of the workplace $c_w$;
  adding elements in the location array $P_b$ into the location array $P_m$ sequentially; and
  removing the location of the home $c_h$ and the location of the workplace $c_w$ from the location array $P_m$,
  wherein, for each element $r_b$ in the location array $P_b$, adding the element $r_b$ into the location array $P_m$ comprises:
    for each location k, determining a total length increment caused by inserting $r_b$ into a location k, where k=pos . . . , Q, pos is a location of an element inserted into the location array $P_m$ last time, Q is a number of elements in the location array $P_m$; and
    selecting a location minimizing the total length increment as the inserting location of $r_b$.

5. The method according to claim 4, wherein combining the time array $D_a$ of the commute trajectory cluster $C_a$ and the time array $D_b$ of the commute trajectory cluster $C_b$, to obtain the time array $D_m$ comprises:
  weighting each element in $D_a$ by distance to obtain $D_a'$, and weighting each element in $D_b$ by distance to obtain $D_b'$; and
  determining the time array $D_m$ according to $D_a'$ and $D_b'$ based on a formula of:

$$D_m[i] = \begin{cases} (D_a'[i] + D_b'[i])/2, & \text{if } D_a'[i] \neq 0, D_b'[i] \neq 0 \\ D_a'[i], & \text{if } D_a'[i] \neq 0, D_b'[i] = 0 \\ D_b'[i], & \text{if } D_a'[i] = 0, D_b'[i] \neq 0 \\ 0, & \text{if } D_a'[i] = 0, D_b'[i] = 0 \end{cases},$$

wherein, weighting each element D[i] in $D_a$ or $D_b$ comprises:
  for each element D[i] in $D_a$ or $D_b$, determining a position $\text{index}_{start}$ of a start record point $r_{start}$ corresponding to D[i] in the location array $P_m$, and determining a position $\text{index}_{end}$ of an end record point $r_{end}$ corresponding to D[i] in the location array $P_m$;
  determining a sum d of distances between each two adjacent record points located between the position $\text{index}_{start}$ and the position $\text{index}_{end}$ in $P_m$ based on the location array $P_m$; and
  weighting D[i] by the sum d to obtain D'[i] according to a formula of:

$$D'[i] = \frac{\text{distance}(P_m[i], P_m[i+1])}{d} \times t,$$

where $i \geq \text{index}_{start}$, and $i < \text{index}_{end}$.

6. The method according to claim 4, wherein, for each commute trajectory T of the at least one commute trajectory, determining, by the one or more computing devices, the commute speed of the user according to the combined trajectory corresponding to the commute trajectory cluster to which the commute trajectory T belongs, comprises:
  determining a first location $p_{start}$ and a first time point $t_{start}$ corresponding to a first record point in the commute trajectory T, and determining a second location $p_{end}$ and a second time point $t_{end}$ corresponding to a last record point in the commute trajectory T;
  determining a distance between the first location $p_{start}$ and the second location $p_{end}$ based on the combined trajectory corresponding to the commute trajectory cluster to which the commute trajectory T belongs; and
  determining the commute speed according to the first time point $t_{start}$, the second time point $t_{end}$, and the distance between the first location $p_{start}$ and the second location $p_{end}$.

7. The method according to claim 4, wherein, determining, by the one or more computing devices, the commute time period corresponding to the commute trajectory T according to the commute speed, comprises:
  determining a first time period $d_{home}$ used from home of the user to the first point in the combined trajectory according to the commute speed and a distance $l_{home}$ from home of the user to the first point in the combined trajectory, and determining a second time period $d_{home}$ used from the last point in the combined trajectory to the workplace of the user according to the commute speed and a distance $l_{comp}$ from the last point in the combined trajectory to the workplace of the user;
  determining a third time period $d_{start}$ used from the first point of the combined trajectory to the first location $p_{start}$ according to the combined trajectory, and determining a fourth time period $d_{end}$ used from the second location $p_{end}$ to the last point of the combined trajectory according to the combined trajectory;
  calculating a commute start time point and a commute end time point of the user according to a formula as:

$$t_{leave} = t_{start} - d_{start} - d_{home}$$

$$t_{arrive} = t_{end} + d_{end} + d_{comp}; \text{ and}$$

determining the commute time period corresponding to the commute trajectory T according to a formula as:

$$d_{commute} = t_{arrive} - t_{leave}.$$

8. A device for determining a personal commute time period, comprising:
  one or more processors; and
  a memory, configured to store one or more programs, when executed by the one or more processors, cause the one or more processors to perform a method for determining a personal commute time period, comprising:
    collecting positioning data of a user within a preset time period, the positioning data being Global Positioning System (GPS) positioning data of a mobile terminal that is collected according to a preset frequency and stored when the user's geographical location changes;
    determining a location of home and a location of workplace of the user based on positioning data; and
    ranking the positioning data based on time, selecting positioning data corresponding to locations between the location of the home and the location of the workplace, and generating data of the at least one commute trajectory according to the selected out positioning data, the at least one commute trajectory respectively corresponding to at least one day within the preset time period, and each commute trajectory is a trajectory from the home to the work place of the user;
    performing, by the one or more computing devices, cluster analysis on the data of the at least one commute trajectory to obtain at least one commute trajectory cluster, and obtaining a combined trajectory by combining the commute trajectories in the corresponding commute trajectory cluster;

wherein performing, by the one or more computing devices, cluster analysis on the data of the at least one commute trajectory to obtain at least one commute trajectory cluster comprises:

S1, initializing a commute trajectory cluster according to data of each commute trajectory, to obtain at least one commute trajectory cluster;

S2, determining whether a number of the at least one commute trajectory cluster is greater than 1;

S3, in response to that the number of the at least one commute trajectory cluster is greater than 1, obtaining a similarity between each two commute trajectory clusters;

S4, determining whether a smallest similarity of the obtained similarities is greater than a preset similarity threshold;

S5, in response to that the smallest similarity is smaller than or equal to the preset similarity threshold, combining the two commute trajectory clusters that have the smallest similarity into one commute trajectory cluster; and S6, repeating S2-S5, until the number of the at least one commute trajectory cluster is smaller than or equal to 1 or the smallest similarity is greater than the preset similarity threshold;

for each commute trajectory T of the at least one commute trajectory, determining, by the one or more computing devices, a commute speed of the user according to a combined trajectory corresponding to a commute trajectory cluster to which the commute trajectory T belongs;

determining, by the one or more computing devices, a commute time period corresponding to the commute trajectory T according to the commute speed; and displaying each commute trajectory T and the commute time period corresponding to each commute trajectory T on a display screen of the mobile terminal;

wherein the at least one commute trajectory corresponds to at least one day respectively, and initializing a commute trajectory cluster according to data of each commute trajectory, to obtain at least one commute trajectory cluster comprises:

for a commute trajectory $T_i$ of the $i^{th}$ day, ranking data of record points of the commute trajectory $T_i$ based on time, wherein, $1 \leq i \leq N$, N is the number of the at least one commute trajectory, data of each record point comprises a user identification uid, a longitude coordinate lng, a latitude coordinate lat, and a timestamp time;

determining a location array $P_i$ of the commute trajectory $T_i$ based on the longitude coordinates and the latitude coordinates of the record points of the commute trajectory $T_i$, and determining a time array $D_i$ of used time period between two adjacent record points of the commute trajectory $T_i$; and generating a commute trajectory cluster $C_i$ based on the commute trajectory $T_i$, the location array $P_i$, and the time array $D_i$, where, $C_i = <<P_i, D_i>, \{T_i\}>$, the location array $P_i$, and the time array $D_i$ forms a combined commute trajectory $<P_i, D_i>$ of the commute trajectory cluster $C_i$;

wherein the similarity between two commute trajectory clusters is determined according to following formula:

$$D_M(A,B) = L(M)/\max(L(A), L(B))$$

where, $D_M(A, B)$ represents the similarity between commute trajectories A and B, M represents a combined commute trajectory of commute trajectories A and B, L(M) represents a length of the combined commute trajectory M, L(A) represents a length of the commute trajectory A, L(B) represents a length of the commute trajectory B.

9. The device according to claim 8, wherein the time array $D_i$ of used time period between two adjacent record points of the commute trajectory $T_i$ is determined according to following formula:

$$D_i[j] = T_i[j+1].\text{time} - T_i[j].\text{time}$$

where, $D_i[j]$ represents $j^{th}$ element in the time array $D_i$, $T_i[j]$.time represents a timestamp of $j^{th}$ record point $T_i[j]$, and $T_i[j+1]$.time represents a timestamp of $(j+1)^{th}$ record point $T_i[j+1]$.

10. The device according to claim 8, wherein combining the two commute trajectory clusters that have the smallest similarity into one commute trajectory cluster comprises:

combining a location array $P_a$ of a commute trajectory cluster $C_a$ and a location array $P_b$ of a commute trajectory cluster $C_b$, to obtain a location array $P_m$, wherein the commute trajectory cluster $C_a$ and the commute trajectory cluster $C_b$ are the two commute trajectory clusters that have the smallest similarity;

combining a time array $D_a$ of the commute trajectory cluster $C_a$ and a time array $D_b$ of the commute trajectory cluster $C_b$, to obtain a time array $D_m$; and generating a commute trajectory cluster $C_m$ according to the location array $P_m$, the time array $D_m$, and data of all commute trajectories in the commute trajectory cluster $C_a$ and the commute trajectory cluster $C_b$, wherein $C_m = <<P_m, D_m>, \{T_m\}>$, $T_m$ represents data of all the commute trajectories in the commute trajectory cluster $C_a$ and the commute trajectory cluster $C_b$.

11. The device according to claim 10, wherein combining the location array $P_a$ of the commute trajectory cluster $C_a$ and the location array $P_b$ of the commute trajectory cluster $C_b$, to obtain the location array $P_m$, comprises:

generating an initial location array $P_m$ based on elements in the location array $P_a$, a location of the home $c_h$, and a location of the workplace $c_w$;

adding elements in the location array $P_b$ into the location array $P_m$ sequentially; and removing the location of the home $c_h$ and the location of the workplace $c_w$ from the location array $P_m$, wherein, for each element $r_b$ in the location array $P_b$, adding the element $r_b$ into the location array $P_m$ comprises:

for each location k, determining a total length increment caused by inserting $r_b$ into a location k, where k=pos . . . , Q, pos is a location of an element inserted into the location array $P_m$ last time, Q is a number of elements in the location array $P_m$; and selecting a location minimizing the total length increment as the inserting location of $r_b$.

12. The device according to claim 11, wherein combining the time array $D_a$ of the commute trajectory cluster $C_a$ and the time array $D_b$ of the commute trajectory cluster $C_b$, to obtain the time array $D_m$ comprises:

weighting each element in $D_a$ by distance to obtain $D_a'$, and weighting each element in $D_b$ by distance to obtain $D_b'$; and determining the time array $D_m$ according to $D_a'$ and $D_b'$ based on a formula of:

$$D_m[i] = \begin{cases} (D_a'[i] + D_b'[i])/2, & \text{if } D_a'[i] \neq 0, D_b'[i] \neq 0 \\ D_a'[i], & \text{if } D_a'[i] \neq 0, D_b'[i] = 0 \\ D_b'[i], & \text{if } D_a'[i] = 0, D_b'[i] \neq 0 \\ 0, & \text{if } D_a'[i] = 0, D_b'[i] = 0 \end{cases},$$

wherein, weighting each element $D[i]$ in $D_a$ or $D_b$ comprises:

for each element $D[i]$ in $D_a$ or $D_b$, determining a position $index_{start}$ of a start record point $r_{start}$ corresponding to $D[i]$ in the location array $P_m$, and determining a position $index_{end}$ of an end record point $r_{end}$ corresponding to $D[i]$ in the location array $P_m$;

determining a sum d of distances between each two adjacent record points located between the position $index_{start}$ and the position $index_{end}$ in $P_m$ based on the location array $P_m$; and weighting $D[i]$ by the sum d to obtain $D'[i]$ according to a formula of:

$$D'[i] = \frac{\text{distance}(P_m[i], P_m[i+1])}{d} \times t,$$

where $i \geq index_{start}$, and $i < index_{end}$.

* * * * *